United States Patent

Buysch et al.

Patent Number: 5,652,275
Date of Patent: Jul. 29, 1997

[54] PROCESS FOR THE CHEMICAL RECYCLING OF POLYCARBONATES

[75] Inventors: Hans-Josef Buysch, Krefeld; Steffen Kühling, Meerbusch, both of Germany

[73] Assignee: Bayer Aktiengesellschaft, Leverkusen, Germany

[21] Appl. No.: 665,589

[22] Filed: Jun. 18, 1996

Related U.S. Application Data

[63] Continuation of Ser. No. 489,046, Jun. 9, 1995, abandoned.

[30] Foreign Application Priority Data

Jun. 21, 1994 [DE] Germany .......................... 44 21 701.3

[51] Int. Cl.$^6$ .................. C08J 11/18; C08F 6/00
[52] U.S. Cl. ................ 521/48; 521/48.5; 528/185; 528/196; 528/206; 528/480
[58] Field of Search ............. 521/48, 48.5; 528/185, 528/196, 206, 480

[56] References Cited

U.S. PATENT DOCUMENTS

| | | | |
|---|---|---|---|
| 5,373,082 | 12/1994 | Kauth et al. | 528/196 |
| 5,420,241 | 5/1995 | Fennhoff et al. | 528/198 |

FOREIGN PATENT DOCUMENTS

| | | |
|---|---|---|
| 46353 | 6/1966 | Germany . |
| 4240314 | 6/1994 | Germany . |

*Primary Examiner*—Paul R. Michl
*Assistant Examiner*—Olga Asinovsky
*Attorney, Agent, or Firm*—Connolly And Hutz

[57] ABSTRACT

The invention relates to a process for the chemical recycling of polycarbonates by catalyzed reaction with diaryl carbonates to oligocarbonates which are crystallized, purified and then polycondensed back to polycarbonates, insoluble constituents optionally being removed before the crystallization step.

5 Claims, No Drawings

PROCESS FOR THE CHEMICAL RECYCLING OF POLYCARBONATES

This application is a continuation of application Ser. No. 08/489,046 filed on Jun. 9, 1995 now abandoned.

This invention relates to a process for the chemical recycling of thermoplastic aromatic polycarbonates which is characterized in that the polycarbonates are degraded with diaryl carbonates to oligocarbonates in the presence of catalysts and the oligocarbonates are crystallized, purified and then polycondensed back to thermoplastic polycarbonates, insoluble constituents optionally being removed before the crystallization step.

It is known that thermoplastic polycarbonates can be degraded with diaryl carbonates to the monomer units (See, for example, DDR-PS 46 353). However, the units cannot be isolated and purified by this process. In the case of heavily contaminated polycarbonates, the reaction mixture obtained is first dissolved in alcohol, clarified with active carbon and then immediately re-condensed. In this way, it is only possible at best to remove colored impurities, but not additives and decomposition products of the polycarbonates from thermal, oxidative and photo-chemical damage. These are responsible for inadequacies during the resynthesis, such as unsatisfactory color quality and mechanical properties.

It is known from German patent application P 4 240 314.6 (Le A 29 274) of 1.12.1992 that polycarbonates can be degraded to oligocarbonates by reaction with monophenols and that the oligocarbonates obtained can be subsequently condensed back to polycarbonates. This process is also attended by the disadvantage that the oligomers cannot be purified and that oligomers terminated by OH groups are far more sensitive to heat and oxidation, discolor rapidly and are damaged.

It has now been found that the chemical recycling of polycarbonates can be distinctly improved by degrading the polycarbonates with diaryl carbonates rather than with monophenols and continuing the degradation reaction only as far as the oligocarbonates and not to the monomer units.

Polycarbonates in the context of the invention are generally those based on aliphatic and/or araliphatic and/or aromatic dihydroxy compounds of the type which are, and can be, used on an industrial scale.

Aliphatic dihydroxy compounds are, for example, ethylene glycol, 1,2- and 1,3-propylene glycol, neopentyl glycol, hexane-1,6-diol, cyclohexane dimethanol, 2,2,5-trimethylhexane-1,6-diol, dodecane-1,2-diol, trimethylol propane monoallyl ether, dianhydrosorbitol, diglycol, triglycol, tetraglycol or mixtures of these diols, preferably neopentyl glycol and hexanediol.

Araliphatic dihydroxy compounds are, for example, xylylene diols, the ethoxylation products of bisphenols, such as hydroquinone, resorcinol, pyrocatechol, bisphenol A, dihydroxydiphenyl, dihydroxydiphenyl sulfone, bisphenol F, bisphenol Z and other typically used bisphenols or mixtures of these diols, preferably the ethoxylation products of 2,2-bis-(4-hydroxyphenyl)-propane.

Aromatic dihydroxy compounds are, for example, dihydroxybenzenes, dihydroxybiphenyl, dihydroxydiphenyl ether, dihydroxydiphenyl sulfide, dihydroxydiphenyl sulfone, dihydroxydiphenyl methane (bisphenol F), dihydroxydiphenyl ethane, dihydroxydiphenyl propane (bisphenol A), dihdroxydiphenyl cyclohexane (bisphenol Z), 3,3,5-trimethyl-1,1-(dihydroxydiphenyl)-cyclohexane, α,α'-(dihydroxyphenyl)-diisopropyl benzenes, dihydroxybenzophenone or mixtures of these aromatic dihydroxy compounds, preferably bisphenol A, bisphenol Z, dihydroxydiphenyl methane and 3,3,5-trimethyl-1,1-(dihydroxydiphenyl)-cyclohexane. Bisphenol A is particularly preferred.

The polycarbonates to be degraded in accordance with the invention are known from the literature.

The polycarbonates to be degraded may have molecular weights Mw (weight average as determined, for example, by gel permeation chromatography) in the range from 12,000 to 200,000 and preferably in the range from 15,000 to 80,000. The molecular weights may also be determined in known manner by measurement of the relative viscosity in $CH_2Cl_2$ at 25° C. and at a concentration of 0.5% by weight.

Preferred polycarbonates for degradation are the aromatic thermoplastic polycarbonates which are preferably produced from at least one of the following diphenols: 4,4'-dihydroxydiphenyl, 2,2-bis-(4-hydroxyphenyl)-propane (bisphenol A), 2,4-bis-(4-hydroxyphenyl)-2-methyl butane, 1,1-bis-(4-hydroxyphenyl)-cyclohexane, α,α'-bis-(4-hydroxyphenyl)-p-diisopropyl benzene, 2,2-bis-(3-chloro-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethyl cyclohexane.

The polycarbonates to be degraded in accordance with the invention may also be branched in known manner by incorporation of trifunctional or more than trifunctional compounds.

Various polycarbonate molding compounds, preferably polycarbonate waste for which there is no longer any other use, or waste accumulating in the production of polycarbonate moldings, polycarbonate moldings which have become unusable, etc., may generally be used for the process according to the invention, optionally after size-reduction.

Accordingly, the polycarbonates to be degraded in accordance with the invention may still contain typical additives, such as mineral fillers, such as silica flour, glass powder, glass fibers, stabilizers, UV stabilizers, lubricants, pigments, dyes, and also polymeric blending components such as, for example, vinyl polymers of styrene, acrylonitrile and butadiene.

Catalysts suitable for use in accordance with the invention are the known transesterification catalysts, such as for example hydrides, oxides, hydroxides, alcohols, amides or salts of alkali metals, such as lithium, sodium, potassium, rubidium and caesium, preferably lithium, sodium and potassium and, more preferably, sodium and potassium. Salts of alkali metals are those of organic and inorganic acids, such as for example acetic acid, propionic acid, butyric acid, benzoic acid, stearic acid, carbonic acid, hydrochloric acid, HBr, HI, nitric acid, $H_2SO_4$, HF, phosphoric acid, boric acid, tin acids and antimony acids. Preferred alkali metal catalysts are alkali metal oxides, hydroxides, alcoholates, acetates, propitiates, benzoates, carbonates and hydrogen carbonates. Particularly preferred alkali metal catalysts are alkali metal hydroxides, alcoholates, acetates, benzoates and carbonates. The alkali metal catalysts are used in quantities of 0.00005 to 10% by weight, preferably in quantities of 0.0001 to 5% by weight and more preferably in quantities of 0.0002 to 3% by weight, based on the total quantity by weight of polycarbonate to be degraded.

The alkali metal catalysts may optionally be used in combination with complexing agents, such as for example crown ethers, polyethylene glycols or bicyclic nitrogen-containing cryptands.

One example of a suitable crown ether is dibenzo-18-crown-6 while an example of a nitrogen-containing cryptand is 1,9-dimethyl, 1,9-diaza-dibenzo-18-crown-6.

The complexing agents are used in quantities of 0.1 to 200 mole-% and preferably in quantities of 1 to 100 mole-% per mole of alkali metal compound.

Other catalysts for the degradation of polycarbonates in accordance with the invention are nitrogen-containing bases, such as for example secondary and tertiary amines, such as triethylamine, tributylamine, methyl dibenzylamine and dimethyl cyclohexylamine, diazabicycloundecane or diazabicyclononane.

The nitrogen-containing bases are used in quantities of 0.0001 to 21% by weight, preferably in quantities of 0.0005 to 6% by weight and more preferably in quantities of 0.001 to 3% by weight, based on the total quantity by weight of polycarbonate to be degraded.

Other suitable catalysts for the degradation of polycarbonates in accordance with the invention are complexes or salts or compounds of magnesium, calcium, barium, zinc, tin, titanium or zirconium. Examples of such systems are tin methoxide, dimethyl tin, dibutyl tin oxide, dibutyl tin dilaurate, tributyl tin hydride, dibutyl tin chloride, tin(II) ethyl hexanoates, zirconium alkoxides (methyl, ethyl, butyl), zirconium(IV) halides (F, Cl, Br, I), zirconium nitrates, zirconium acetyl acetonate, titanium alkoxides (methyl, ethyl, isopropyl), titanium acetate and titanium acetyl acetonate.

These catalysts are used in quantities of 0.00005 to 10% by weight and more preferably quantifies of 0.0001 to 5% by weight and more preferably in quantities of 0.00002 to 3% by weight, based on the total quantity by weight of polycabonte to be degraded.

The degradation of polycarbonate in accordance with the invention may also be carried out with heterogeneous catalysts which may be present in powder form or in the form of beads, granules, rodlets or fragments varying in length and diameter between 0.3 and 20 mm and preferably between 0.5 and 10 mm.

Heterogeneous catalysts in the context of the invention are, above all, active carbons, i.e. activated carbon which may be produced from various carbon-yielding precursors. The processes for conversion into the active form may also be very different. These processes give active carbons with BET surfaces in the range from 200 to 3,000 $m^2/g$, preferably in the range from 300 to 2,000 $m^2/g$ and more preferably in the range from 500 to 1,500 $m^2/g$.

Suitable active carbons are, for example, those based on wood, various types of coal, bitumen, mineral oil tars, peat, lignin, polysaccharides, bones and cokes. They are used in known manner.

Diaryl carbonates in the context of the invention are diphenyl, dicresyl, dixylenyl, dichlorophenyl, ditert.butyl phenyl, dinaphthyl and diphenyl carbonate, preferably diphenyl and dicresyl carbonate, more preferably diphenyl carbonate.

The degradation of the polycarbonates in accordance with the invention by reaction with diaryl carbonates may be carried out discontinuously or continuously, in bulk or in the presence of a polycarbonate solvent.

Suitable solvents are those-which are inert under the reaction conditions and which dissolve the polycarbonates under the reaction conditions.

Examples of suitable solvents are hydrocarbons, such as octane, dodecane, isooctane, isododecane, decalin, toluene, xylenes, cumene, cymol, trimethyl benzenes, tetramethyl benzenes, diisopropyl benzenes, tetralin, naphthalene and bisphenyl, ethers, such as dibutyl ether, dioxane, dimethyl diglycol, diethyl triglycol, dimethyl tetraglycol, anisole, phenyl butyl ether, methoxytoluenes, dimethoxybenzenes and diphenyl ethers, halogenated hydrocarbons, such as chlorobenzene, dichlorobenzene, bromobenzene, dibromobenzenes, chloronaphthalenes, chlorotoluenes, chloroxytenes and chlorocumenes and also amides, such as dimethyl acetamide, N-acetyl morpholine and N,N-dimethyl benzamide.

The quantity by weight of solvent is 1 to 20 times, preferably 2 to 15 times and more preferably 3 to 12 times the quantity by weight of polycarbonate to be degraded.

Where the degradation process is discontinuous, the reaction is carried out in stirred tank reactors, kneaders or other heatable mixers familiar to the expert. Continuous degradation is preferably carried out, for example, in mixers for high-viscosity materials, for example various types of extruders into which the polycarbonate, diaryl carbonate and catalyst may be separately introduced at various places or even together.

The reaction takes place at temperatures of 120° C. to 320° C., preferably at temperatures of 150° C. to 310° C. and more preferably at temperatures of 160° C. to 300° C. In the presence of a solvent, the reaction has to be carried out under an elevated pressure of up to about 100 bar—commensurate with the vapor pressure of the solvent—if the solvent is to remain in the mixture.

The molar ratio of polycarbonate (based on the structural unit) to diaryl carbonate is between 1:0.05 and 1:3.5, preferably between 1:0.10 and 1:3.0, more preferably between 1:0.15 and 1:2.5 and most preferably between 1:0.20 and 1:2.0.

The reaction time varies from several hours to a few minutes, depending on the viscosity of the reaction mixture, the quantity of catalyst and the temperature, and in general can readily be determined by measurement of the viscosity which reaches a constant value after the degradation reaction.

If a heterogeneous catalyst is used, it may be added to the reaction mixture in powder form where the process is carried out discontinuously and may be removed again by various techniques, such as centrifugation or filtration, after the degradation reaction, but before the crystallization of the oligocarbonates. However, it is preferred to adopt a continuous procedure in which a melt or solution of the reactants is passed over a bed of particulate catalyst at the required temperature and over a sufficient residence time for the reaction. This residence time may be between several hours and about 10 minutes, depending on the temperature, the viscosity and the activity of the catalyst. It may readily be determined by viscosity measurement in preliminary tests.

The oligocarbonates thus obtained have an average molecular weight $\overline{M}w$ (weight average, as determined for example by gel permeation chromatography) in the range from about 500 to 10,000, preferably in the range from 800 to 8,000 and more preferably in the range from 1,000 to 7,000, depending on the molar ratio of polycarbonate to diaryl carbonate used and on whether adjustment of the equilibrium had been awaited. In effect, it is not necessary in every case to allow the reaction between the polycarbonate and the diaryl carbonate to continue to completion, i.e. the adjustment of an equilibrium between the monomers and oligocarbonates. In principle, the reaction may be interrupted at any time and the reaction product worked up. The reaction will best be terminated when oligocarbonates with sufficiently low molecular weights have been formed so that the viscosity is not too high for further processing, i.e. when the $\overline{M}w$ of the oligocarbonates is $\leq 10,000$. A procedure such as this can be of advantage when the oligocarbonate melt is to be diluted with excess diaryl carbonate rather than an added solvent for the purposes of better working up.

The optionally solvents containing mixture of oligocarbonates and generally unreacted diaryl carbonate leaving the reactor may be cooled and granulated if crystallization is to take place at a later stage.

However, it is preferably introduced in the form of a melt into the solvent used for crystallization. Introduction of the melt into the solvent may take place, for example, in a coolable stirred tank reactor designed to operate under pressure, the melt mixing with the solvent, precipitating in crystalline form immediately or after cooling and the crystals being separated from the solvent by known methods.

This process may also be carried out continuously. To this end, the melt leaving the reactor is introduced with the solvent into a continuously operated crystallizer. The crystallizers typically used are suitable for this purpose.

The crystallization temperature is in the range from 10° C. to 180° C. and preferably in the range from 25° C. to 150° C. and depends upon the particular solvent and upon the composition of and the distribution of molecular weight in the oligocarbonate mixture. In general, it may be higher, the higher the molecular weight.

The ratio by weight of solvent to melt is between 10:0.5 and 10:100, preferably between 10:1 and 10:50 and more preferably between 10:2 and 10:30.

Suitable crystallization solvents are those mentioned above except for the glycols and the amides, also esters, such as ethyl acetate, butyl acetate, methyl acetate, carbonates, such as dimethyl and diethyl carbonates, ketones, such as acetone and methyl ethyl ketone, low-boiling alcohols, such as methanol, ethanol and isopropanol. Lower hydrocarbons, ketones, esters, carbonates and alcohols are preferred.

Finally, the crystallizate obtained is dried.

In cases where the polycarbonate used is relatively heavily contaminated or damaged or contains additives to be removed before the condensation step, a second or third crystallization of the oligocarbonates, optionally from another solvent, may be advisable to obtain highly pure oligocarbonate.

Constituents dissolved in the oligocarbonate melt or in the oligocarbonate solution can be removed in this way.

The at least single-stage crystallization of the oligocarbonates may be carried out discontinuously or continuously in known manner by various methods.

The constituents insoluble in the oligocarbonate melt or in the oligocarbonate solution are removed by filtration, centrifugation or sedimentation before introduction of the melt or solution into the crystallization process. The removal of the insoluble constituents is optionally carried out together with removal of the heterogeneous catalyst.

Providing no heterogeneous catalyst was used, the melt or (at elevated temperature) solution leaving the reactor contains the entire quantity of homogeneous catalyst used. Unless it is washed out by the solvent during crystallization, the homogeneous catalyst may remain in the oligocarbonate for the subsequent condensation step.

In some cases, however, it is advisable to remove the catalyst. The catalyst may be quantitatively removed from the melt or from a solution of the oligocarbonates with various adsorbents and ion exchangers. This is done in known manner.

Suitable adsorbents and ion exchangers are, for example, active carbon, kieselguhr, cellulose or zeolites, polymeric crosslinked acrylic acids, aluminas, acid-activated layer silicates and sulfonated crosslinked polystyrene resins. The quantity of adsorbent or ion exchanger must of course by gauged in such a way that it is able to absorb the quantity of catalyst present from the reactor mixture, i.e. the absorbent must be used in a quantity at least equivalent to the catalyst. In general, however, it is used in larger quantities to ensure that removal of the catalyst takes place quickly and effectively, for example in quantities of 2% by weight to 50% by weight, preferably in quantities of 5% by weight to 40% by weight and more preferably in quantities of 8% by weight to 25% by weight, baked on the quantity of polycarbonate used.

Coloring impurities present in the starting polycarbonate can be removed from the melt or from a solution of the oligocarbonates not only by the crystallization step mentioned above, but also by the last-mentioned adsorption-based purification method using adsorbents or ion exchangers.

The oligocarbonates obtained by the process according to the invention accumulate in the form of an easy-to-handle, free-flowing dry powder which does not have any tendency towards oxidation or discoloration, because all phenolic OH groups are blocked by phenyl carbonate groups, and may therefore come into contact with air, even at room temperature. For re-condensation, the powder may readily be introduced into a reactor and optionally mixed with other substances.

The crystallized oligocarbonates are polycondensed to polycarbonates by carrying out the polycondensation reaction at temperatures between 100° C. and 400° C. and preferably at temperatures of 220° C. to 320° C. under a pressure of <100 mbar to 0.01 mbar. However, it can be of advantage to facilitate or promote the polycondensation reaction by establishing a terminal OH to aryl carbonate group ratio of the reactants of >25% OH:<75% aryl carbonate to <50% OH:>50% aryl carbonate. This may be achieved, for example, by addition of bisphenol A in accordance with the calculated values.

It can also be of advantage to re-add transesterification catalysts (see above) to the crystalline, purified oligomers. In the process according to the invention, the polycondensation of the oligomers may be carried out continuously or discontinuously, for example in stirred tank reactors, thin-layer evaporators, cascades of stirred tank reactors, extruders, kneaders, simple disk reactors and high-viscosity disk reactors.

The resynthesized polycarbonates are suitable for all the usual applications, i.e. in electrical engineering, in the building field and in vehicle construction.

Removal of the oligocarbonate crystals from the solution leaves a filtrate which, besides excess diaryl carbonate, contains other oligocarbonates and optionally additives or products arising out of the damage to the polycarbonate. The diaryl carbonates may be retained, for example by distillation, and reused in the degradation process. Depending on the quantity of oligocarbonate remaining behind and on its purity or rather the removability of the unwanted constituents, at least a large part, often up to 90%, of the oligocarbonate may be used for the resynthesis of polycarbonates in accordance with the invention. The remaining oligocarbonate may be used in less demanding polymers such as phenolic resins, or may be disposed of by incineration.

EXAMPLES

Examples 1 to 4

300 g (1.40 moles) of diphenyl carbonate were melted under nitrogen and, after the addition of 0.0026 g of KOH, the melt was heated to 200° C. 1,016 g (4.0 moles) of bisphenol A polycarbonate with a molecular weight of around 28,000 were then added in portions while stirring.

After everything had melted, the temperature was kept at 240° C. for 1 h, after which the melt was poured out, left to solidify and size-reduced. The material obtained was treated under nitrogen for 2 h at the boiling temperature with 2.5 to 3 times the quantity of solvent and then left to cool slowly while stirring. The crystal sludge formed from the oligomers was separated by filtration, compressed, washed with solvent and dried, the combined filtrates were concentrated by evaporation and the residue was distilled in a high vacuum, resulting in the formation of a crystalline distillate (essentially diphenyl carbonate) and a faintly colored glass-like residue.

The results are set out in Table 1.

TABLE 1

| Example | Solvent | Carbonate* oligomers | Melting range | Residue of filtrate | Distillate diphenyl carbonate | Residue oligomers |
|---|---|---|---|---|---|---|
| 1 | Xylene | 737 g | 165–8* | 570 g | 57 g | 510 g |
| 2 | Cyclohexane | 990 g | 172–9* | 321 9 | 61 g | 259 g |
| 3 | Isopropanol | 988 g | 135–9* | 325 g | 66 9 | 256 g |
| 4 | Butyl acetate | 764 g | 180–5* | 546 g. | 63 g | 483 g |

*The average molecular weights $\overline{M}w$ are between 1,800 and 2,200

It can be seen from the Table 1 that, depending on the solvent and the procedure, approximately 700 to 1,000 g (50 to 76%) can be isolated from 1,316 g of educt mixture in the form of a crystalline oligomer mixture suitable for the synthesis of polycarbonates.

The diphenyl carbonate distilled off (approximately 20% of the quantity used) can be completely recycled into the process. More or less all (in the present case at least 90%) of the oligomer residue remaining after distillation can be reused, depending on the impurities. The remainder represents an outlet for secondary products from the polycarbonate damage and other components foreign to the product.

A recycle yield of more than 95% can be obtained in this way.

Examples 5 to 8

As described in Examples 1 to 4, a melt was prepared from 1,016 g (4 moles) of bisphenol A polycarbonate and 670 g (3.13 moles) of diphenyl carbonate and passed over a bed of granulated active carbon at 250° C. and at a rate of 0.3 bed volume/h.

The original viscosity fell from 1.171 to distinctly lower values. The results are set out in Table 2.

The oligomer mixtures thus obtained can be crystallized and worked up as described in Examples 1 to 4.

TABLE 2

| Example | Active carbon | Viscosity |
|---|---|---|
| 5 | I | 1.114 |
| 6 | II | 1.118 |
| 7 | III | 1.065 |
| 8 | IV | 1.086 |

I Norit RS, a product of Norit
II Norit R 2030, a product of Norit
III Norit RB1, a product of Norit
IV Sorbonorit 2, a product of Norit

Examples 9 to 12

As described in Examples 1 to 4, a melt was prepared from 1.016 g (4 moles) of bisphenol A polycarbonate and 1,700 g (7.9 moles) of diphenyl carbonate and passed as in Examples 5 to 8 over a bed of granulated active carbon at 200° C. and at a rate of 2 bed volumes/h.

The results are set out Table 3.

TABLE 3

| (Initial viscosity 1.017) | | |
|---|---|---|
| Example | Active carbon* | Viscosity |
| 9 | I | 1.015 |
| 10 | II | 1.017 |
| 11 | III | 1.015 |

*See legend to Table 2

We claim:

1. A process for the chemical recycling of thermoplastic aromatic polycarbonates comprising degrading said polycarbonates having molecular weights $\overline{M}w$ from 15,000 to 80,000, with diaryl carbonates, in a molar ratio of polycarbonate to diaryl carbonate between 1:0.05 and 1:3.5, at temperatures of 120° C. to 320° C. to oligocarbonates having a $\overline{M}w$ from about 500 to 10,000 in the presence of catalysts, in quantities of 0.00005 to 10% by weight, based on the total quantity by weight of polycarbonate to be degraded, and crystallizing the oligocarbonates, purifying them and then polycondensing them back to thermoplastic polycarbonates, the polycondensation of the oligocarbonates to the polycarbonates being carried out at 100° to 400° C.

2. A process according to claim 1, characterized in that the catalysts are used in quantities of 0.0001 to 5% by weight, based on the total quantity by weight of polycarbonate to be degraded.

3. A process according to claim 1, characterized in that for promoting the polycondensation reaction the terminal OH to aryl carbonate group ratio of the reactants is of >25% OH:<75% aryl carbonate to <50% OH:>50% aryl carbonate.

4. A process according to claim 1, wherein the insoluble constituents are removed before the crystallization step.

5. A process according to claim 1, wherein the $\overline{M}w$ of the oligocarbonates is in the range of about 1,000 to 7,000.

* * * * *